US005739516A

United States Patent [19]
Bricaud

[11] Patent Number: 5,739,516
[45] Date of Patent: Apr. 14, 1998

[54] CIRCUIT BOARD-MOUNTED CARD RECEIVER

[75] Inventor: Hervé Guy Bricaud, Dole, France

[73] Assignee: ITT Composants ET Instruments, Bagneux, France

[21] Appl. No.: 613,165

[22] Filed: Mar. 8, 1996

[30] Foreign Application Priority Data

| Jun. 1, 1994 | [FR] | France | 94 06683 |
| Jun. 1, 1994 | [FR] | France | 94 06684 |
| Jun. 1, 1994 | [FR] | France | 94 06685 |

[51] Int. Cl.[6] ............................................. G06K 7/00
[52] U.S. Cl. .............................................. 235/441; 235/486
[58] Field of Search .................................. 235/441, 486

[56] References Cited

U.S. PATENT DOCUMENTS 5,402,095  3/1995  Janniere .............................. 235/441

FOREIGN PATENT DOCUMENTS

| A0230674 | 5/1987 | European Pat. Off. . |
| A0336330 | 11/1989 | European Pat. Off. . |
| A2645667 | 12/1990 | France . |

*Primary Examiner*—Harold Pitts
*Attorney, Agent, or Firm*—Freilich Hornbaker Rosen

[57] ABSTRACT

A single card receiver assembly is easily mounted on and connected to a circuit board, in a compact arrangement. The circuit board is formed with apertures (200, 202, 88) that respectively receive a connector (34) with card-engaging contact blades (36), a full insertion detector (114), and a latch mechanism (70). The circuit board lower face (30) has traces (230, 232) for engaging vertically compressed connector contact tails (33), to provide surface mount connection of the connector tails to circuit board traces.

11 Claims, 6 Drawing Sheets

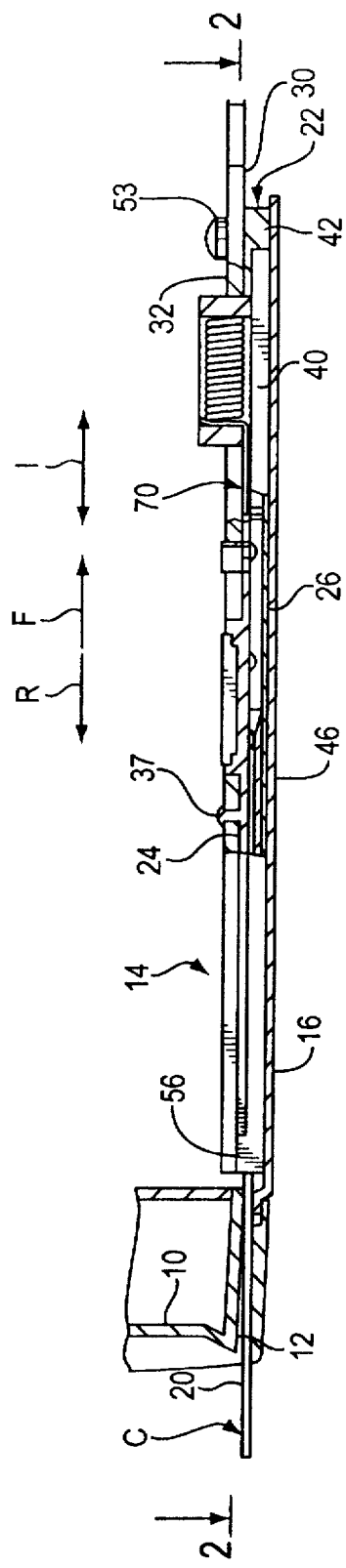
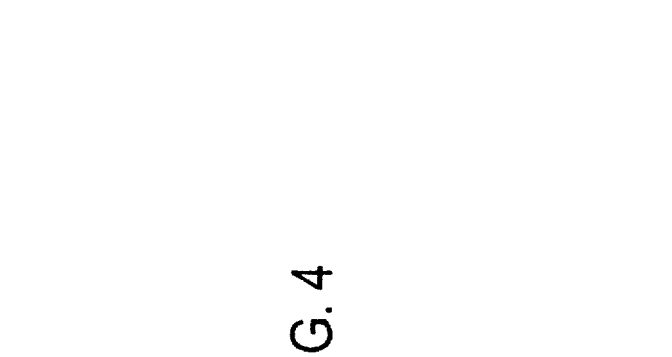
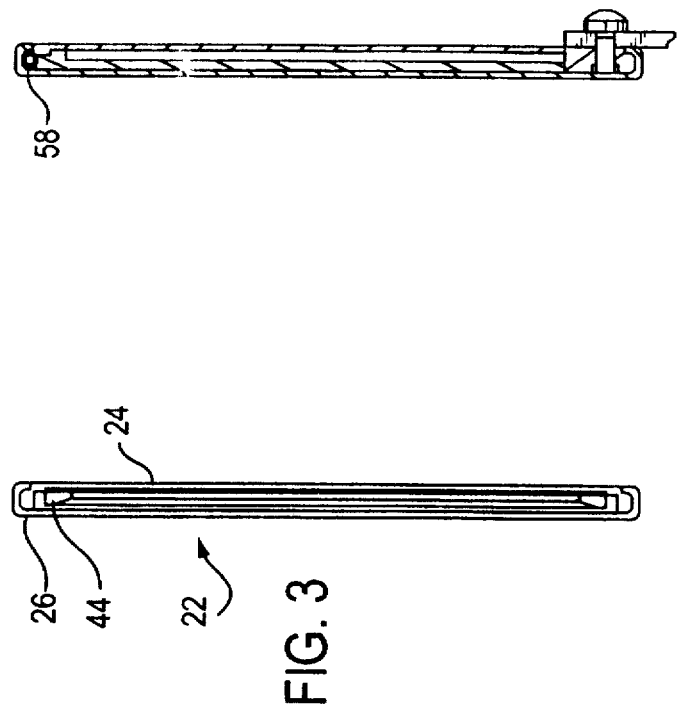

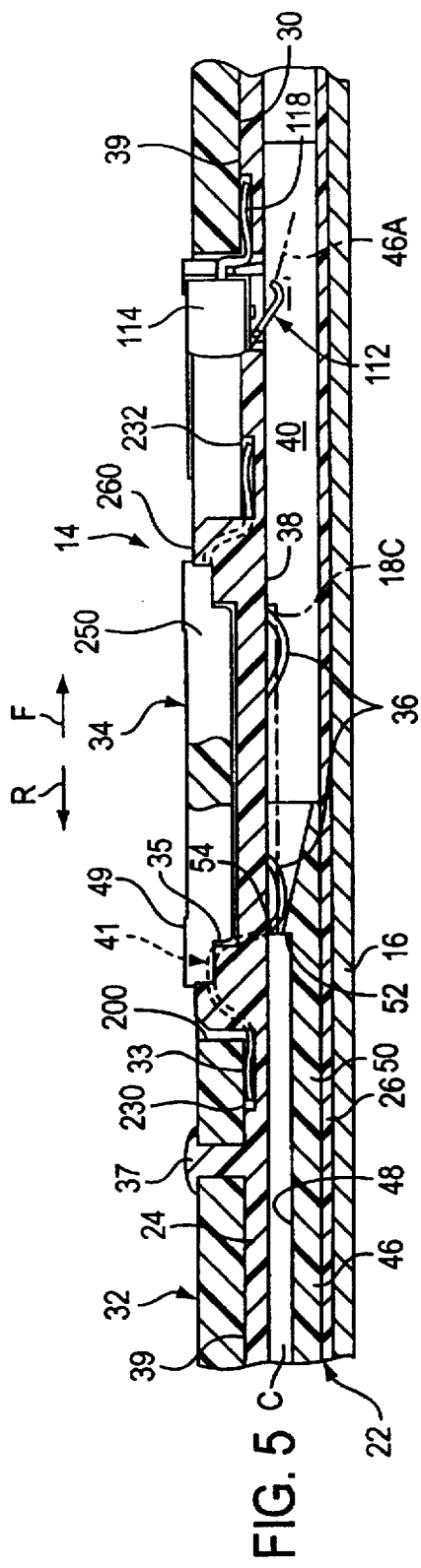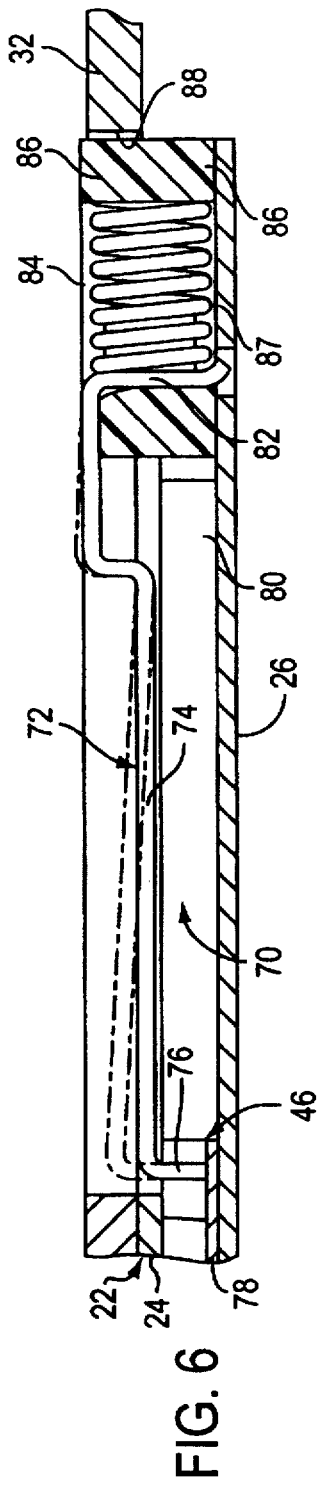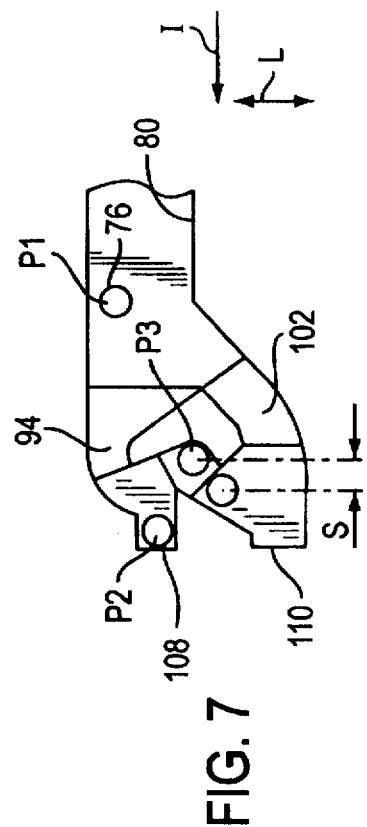

5,739,516

1

CIRCUIT BOARD-MOUNTED CARD RECEIVER

BACKGROUND OF THE INVENTION

There is increasing use of thin cards of about the same size as common credit cards, that bear terminals on one of their faces, especially to provide access to restricted equipment, services, or areas. For example, a card unique to a person's automobile radio can be carried by that person to provide access to the radio, to discourage theft of the radio. The addition of a card receiver to a radio originally designed without such card receiver, results in additional height, which should be a minimum.

A manufacturer can produce a card receiver assembly with a card-receiving case, contact blades to engage card terminals, and a full insertion detector for detecting full insertion of a card. Such an assembly is commonly sold to a customer that assemblies electronic equipment such as an addition to a car radio, and who mounts the assembly on a circuit board. It would be desirable if the arrangement had a minimal height and could be easily attached and detached from a circuit board.

SUMMARY OF THE INVENTION

In accordance with one embodiment of the present invention, a card receiver assembly is provided which can be readily mounted on a circuit board in an installation of low height. The assembly includes a case with upper and lower plates that form a card-receiving slot. The upper plate holds a connector with contacts, the contacts having blades that engage contact pads on the upper surface of a fully inserted card. The connector is manufactured separately from the case, and when mounted thereon the connector body protrudes up from a mount portion of an upper wall of the case. The circuit board is formed with an aperture that receives the upwardly protruding connector, and has conductive traces on the lower board face. Tails of the connector contacts are pushed against the traces and resiliently compressed thereagainst, as by the upper wall of the case.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional side view, taken on line 1—1 of FIG. 2, of a card receiver assembly mounted on a circuit board.

FIG. 3 is a left side view of the receiver assembly of FIG. 2, but without showing the connector or protruding portion of the latch assembly.

FIG. 4 is a view taken on line 4—4 of FIG. 2.

FIG. 5 is an enlarged view of a portion of FIG. 1.

FIG. 6 is an enlarged view of another portion of FIG. 1.

FIG. 7 is an enlarged view of a portion of FIG. 2.

2

Figure 12:
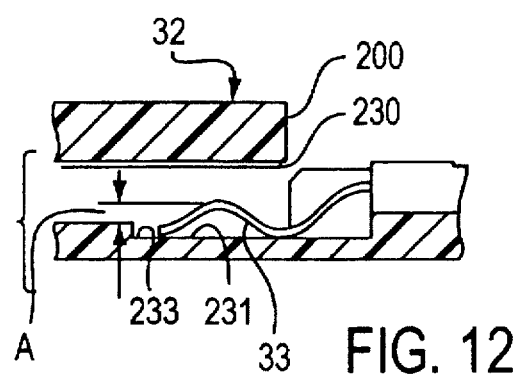

FIG. 12 is an exploded view of a portion of the circuit board and connector contact tails, shown prior to mounting the receiver assembly on the circuit board.

DESCRIPTION OF THE PREFERRED EMBODIMENTS

Figure 2:
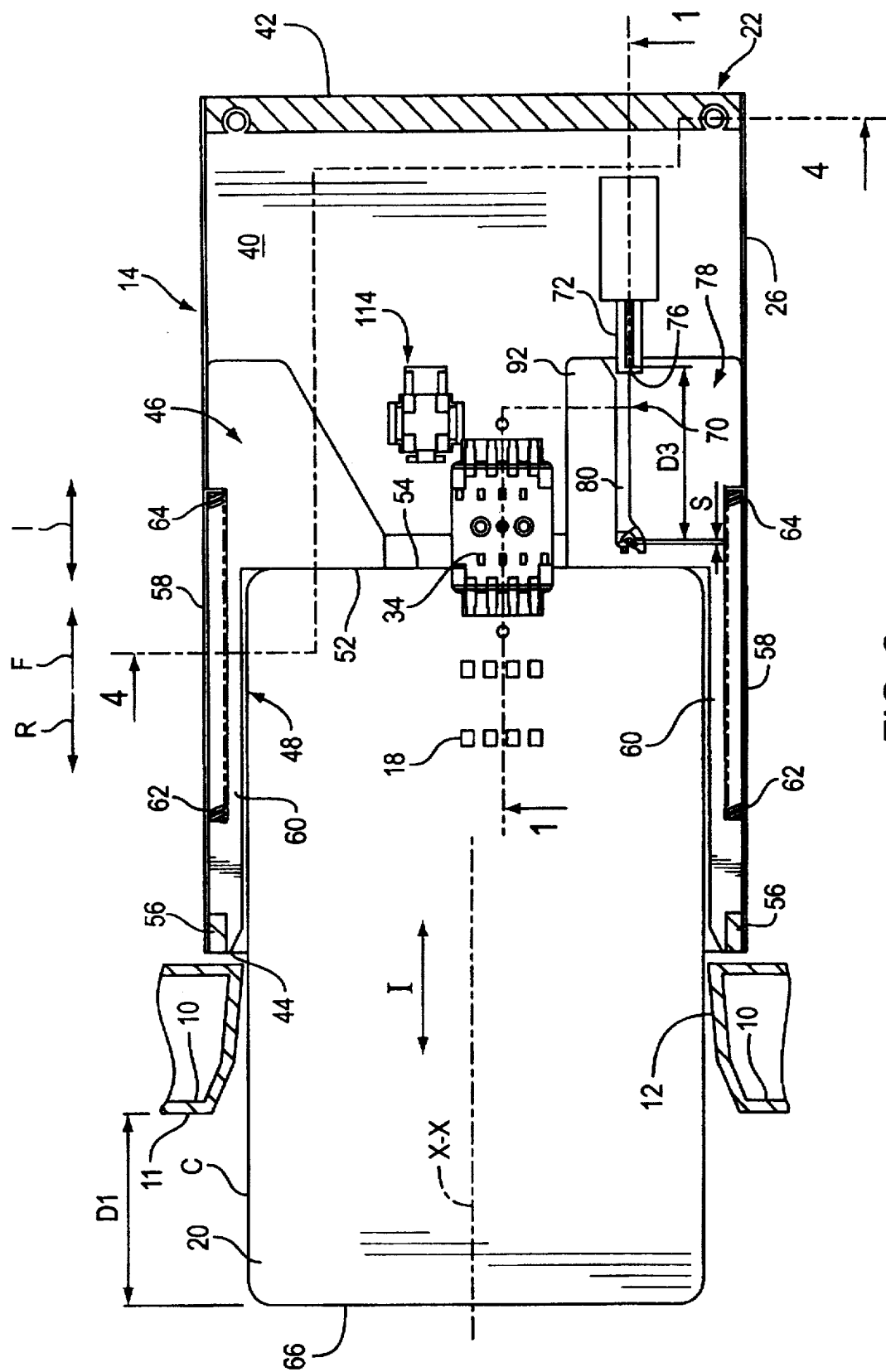
FIG. 2 is a view taken on line 2—2 of FIG. 1.

FIG. 2 shows part of an electronic apparatus 10 with a card-receiving opening 12 that passes an electronic card C, into a slot 40 of a card receiver assembly 14. In one example, the electronic apparatus 10 is an automobile radio that will not play unless a card with proper internal coding has been fully inserted into the slot. As indicated in FIG. 1, the receiver assembly 14 lies at the bottom 16 of the electronic device for the particular example shown, with very little height being available for the receiver assembly. The receiver assembly 14 has a small thickness or height, and is designed to be mounted on the lower face 30 of a circuit board 32.

The receiver assembly 14 includes a case 22 with a main or upper plate 24 that is mounted against the lower face of the circuit board. This is accomplished by fasteners that include four screws 53 at the four corners of the receiver device and two studs 37 that accurately position the case on the board. The upper plate has coplanar upper face mount portions 39 (FIG. 5) that lie facewise against the lower face of the circuit board (it is possible to place a thin gasket between them). The case also includes a lower plate 26, with the card-receiving slot 40 being formed between the upper and lower plates or walls. Spacers 42, 56 space upper and lower slot walls.

As shown in FIG. 5, the receiver assembly includes a slide 46 that can move in forward and rearward directions F, R within the slot 40 formed between the upper and lower plates 24, 26. The slot guides the card in movement along a card path. When a card C is inserted into a guideway 48 formed between an upper surface of the slide 46 and the bottom 38 of the upper plate 24, the card first abuts a transverse face or shoulder 52 of the slide. The card and slide then move forwardly together, until the slide reaches a full insertion position indicated at 46A. Such full insertion is detected by a lever 112 of a switch 114. When the card is fully inserted, contact blades 36 of connector contacts 41 of an electrical connector 34, directly engage contact pads (18 in FIG. 2) on the upper face 20 of the card to pass signals between them, e.g. to read out the code of the card.

It may be noted that a latch mechanism 70 (FIG. 2) retains the slide 46 in its full forward insertion position, after the rear edge 66 of the card has been first pushed fully forward and then released. When the card is no longer pushed forward, the slide moves rearwardly only a small distance such as 0.5 millimeter and then stops at that full insertion position. When the card is pushed forwardly a second time, the mechanism 70 releases the slide, so that the slide and the card therein, are pushed rearwardly to their initial positions by a pair of helical compression springs 58.

As shown in FIG. 5, the electrical connector 34 is formed separately from the case 22 of the card receiver assembly 14. The connector 34 is fastened to the upper plate 24 of the case (along with the switch 114, as by adhesive), the slide 46 and latch mechanism 70 are installed, and the upper plate 24 is fastened to the lower one 26 to complete the receiver assembly. The assembly is then shipped from the receiver assembly manufacturer to a customer. The customer makes (or contracts to have made) a circuit board with large apertures to receive the electrical connector 34, switch 114, and part of the latch assembly 70. Also, the circuit board is formed with conductive traces, including traces at 230, 232 which will engage tails 33 of the electrical connector contacts 41.

Figure 9:
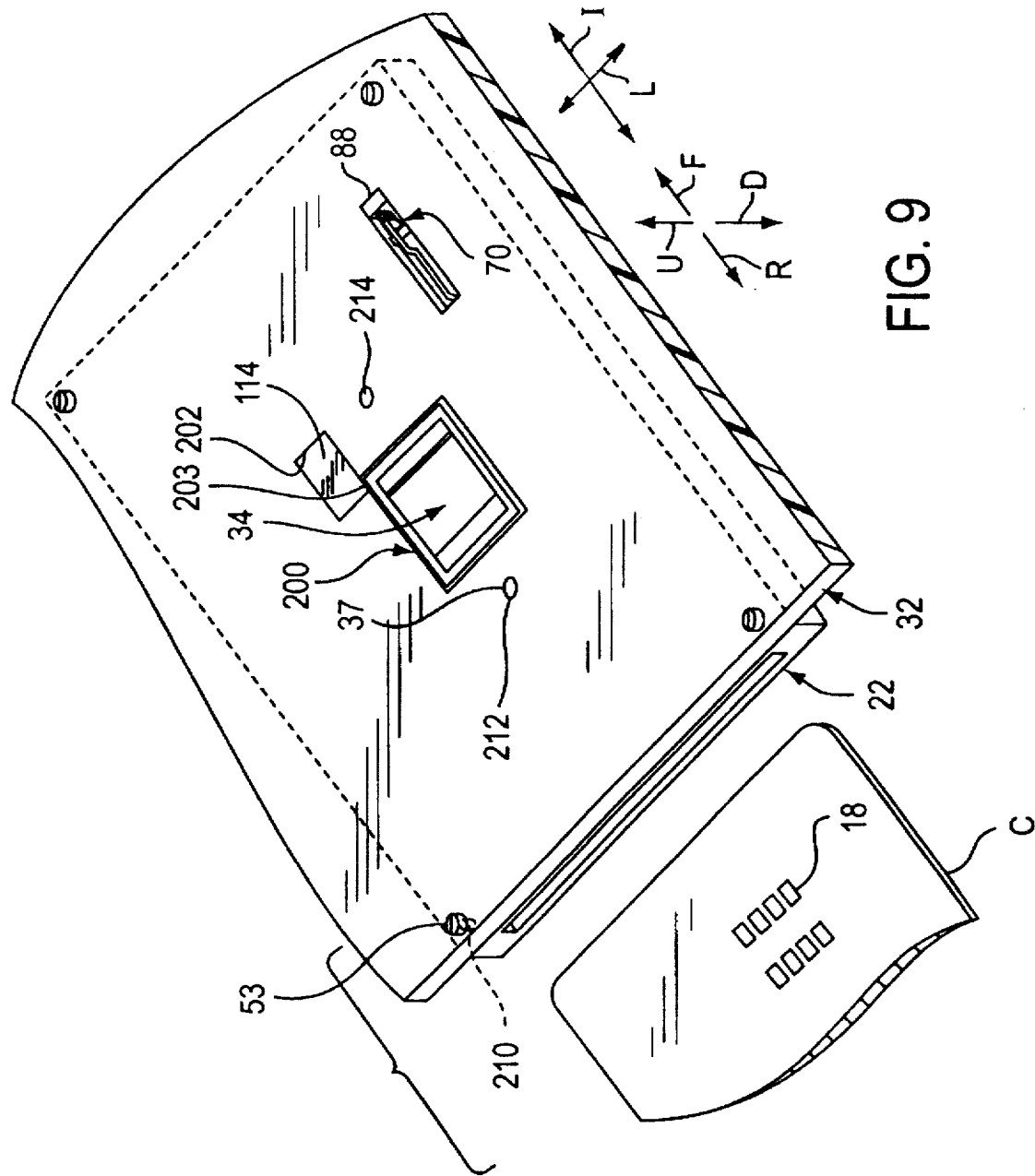
FIG. 9 is a top isometric view of the circuit board and receiver assembly of FIG. 5.

FIG. 9 is a view of the top of the circuit board 32, showing that it has a large aperture 200 for receiving the electrical connector 34 and another aperture 202 for receiving the switch 114. The two apertures are connected by a short passage at 203, so a connector assembly can be used wherein the housing of the connector and of the switch are integral, as described in U.S. application Ser. No. 08/885,536 filed Jan. 18, 1996. Still another aperture 88 is provided to receive portions of the latch assembly 70. The circuit board also has four drilled holes 210 for receiving screws 53 that fasten corners of the case 22 to the board, and has a pair of small drilled holes 212, 214 for receiving thin studs or posts 37 that fasten areas around the connector to the circuit board.

Figure 10:
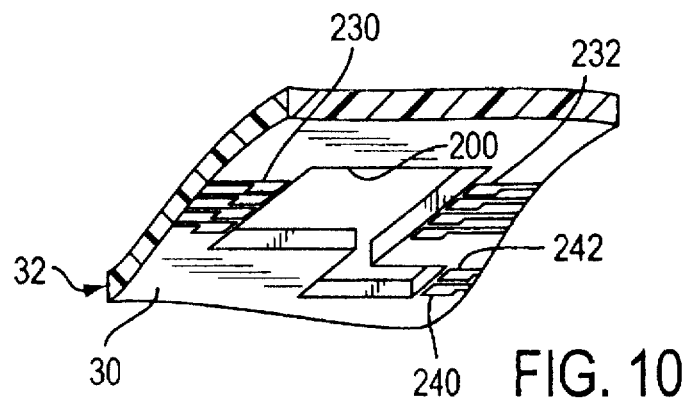
FIG. 10 is a bottom isometric view of just the circuit board of FIG. 9.
Figure 11:
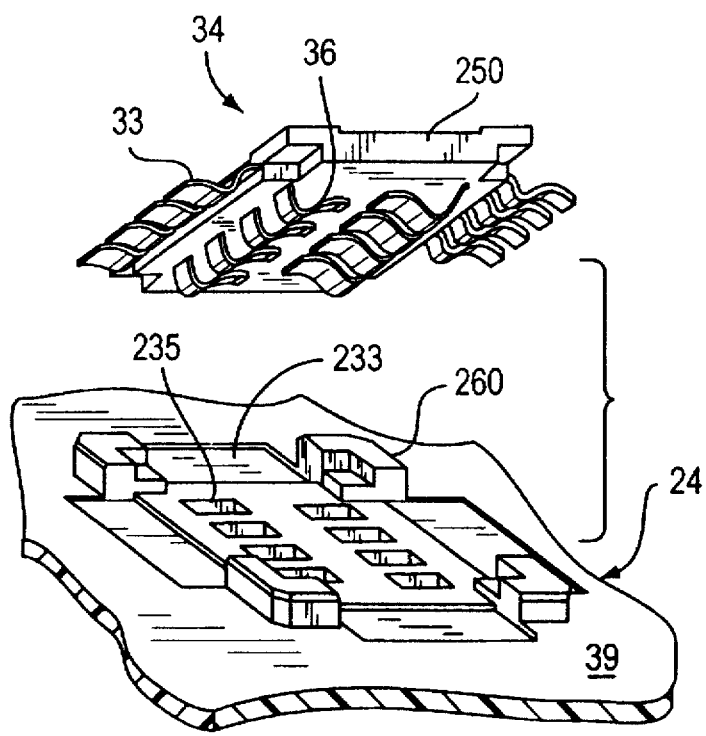
FIG. 11 is an exploded isometric view of the connector and a portion of the upper plate, of FIG. 5.

FIG. 10 shows two rows of electrical traces 230, 232 on the lower face 30 of the circuit board 32. These traces are designed to engage the tails 33 of the connector contacts. FIG. 11 shows that the case upper plate 24 has at least one hole 235 (one large hole can be used in place of the eight smaller holes shown) through which the contact blades 36 can extend. FIG. 5 shows that when the case 22 is pressed up against the lower face 30 of the circuit board, with the posts 37 inserted into board holes and heat staked, the tails 33 of the connector contacts 41 are pressed against the traces 230 on the circuit board. The tails 33 are preferably not flat, but are bent slightly out of a plane so they can be resiliently vertically compressed to press firmly against the circuit board traces. It is possible to solder the contact tails to the circuit board traces, although applicant prefers to not do so, to facilitate initial placement of the card receiver assembly 14 and replacement of a defective assembly. A defective assembly 14 can be replaced by first drilling out the posts 37 and removing the screws 53, so the entire assembly 14 can be removed. Another assembly can be moved into the same position as the one that was removed, and attached by heat staking its posts and reattaching the screws. FIG. 12 shows that each contact tail initially projects above a surface mount portion by a distance A, so the tail will be compressed between the circuit board trace 230 and a bottom wall 231 of the recess 233.

The fact that the connector 34 lies in an aperture 200 in the circuit board, further reduces the height required for the assembly 14. The upper and lower plates 24, 26 can be readily formed by injection molding. The connector 34 is preferably separately molded, with the contacts 41 molded in place in the connector body 250. The switch 114 is similarly mounted, with a pair of terminals 118 of the switch mounted to engage traces 240, 242 (FIG. 10) on the circuit board. The connector 34 and switch 114 can be of the construction shown in document WO-A-95/18421.

It may be noted in FIG. 5, that the connector body 250 is mounted in an upwardly protruding receptacle portion 260 formed in the upper plate 24. The receptacle portion 260 is accurately positioned with respect to the posts 37, and closely fits in the board hole 200. The receptacle portion accurately positions the connector body, so its contact blades lie at a contact location at 18C that is occupied by the card contact pads of a fully inserted card. The area occupied by the aperture 200 is preferably no more than twice the area occupied by the connector body 250, as seen in a plan view, and is preferably not more than 50% greater. This minimizes weakening of the circuit board and increases the circuit board area available for traces and components.

The slide 46 has a flat bottom 50 which bears against the lower plate 26 of the case. The transverse face or shoulder 52 of the slide is engaged by the front edge 54 of an inserted card. After the card has been first inserted into the slide and is pressed forwardly, the slide moves forwardly until stopped by the latch mechanism 70 (FIG. 2). The slide is urged rearwardly by the two springs 58 that lie on either side of arms 60 of the slide. The rear ends of the springs bear against bearing surfaces 62 on the slide, while the forward ends of the springs bear against stationary surfaces 64 on the case 22.

Figure 8:
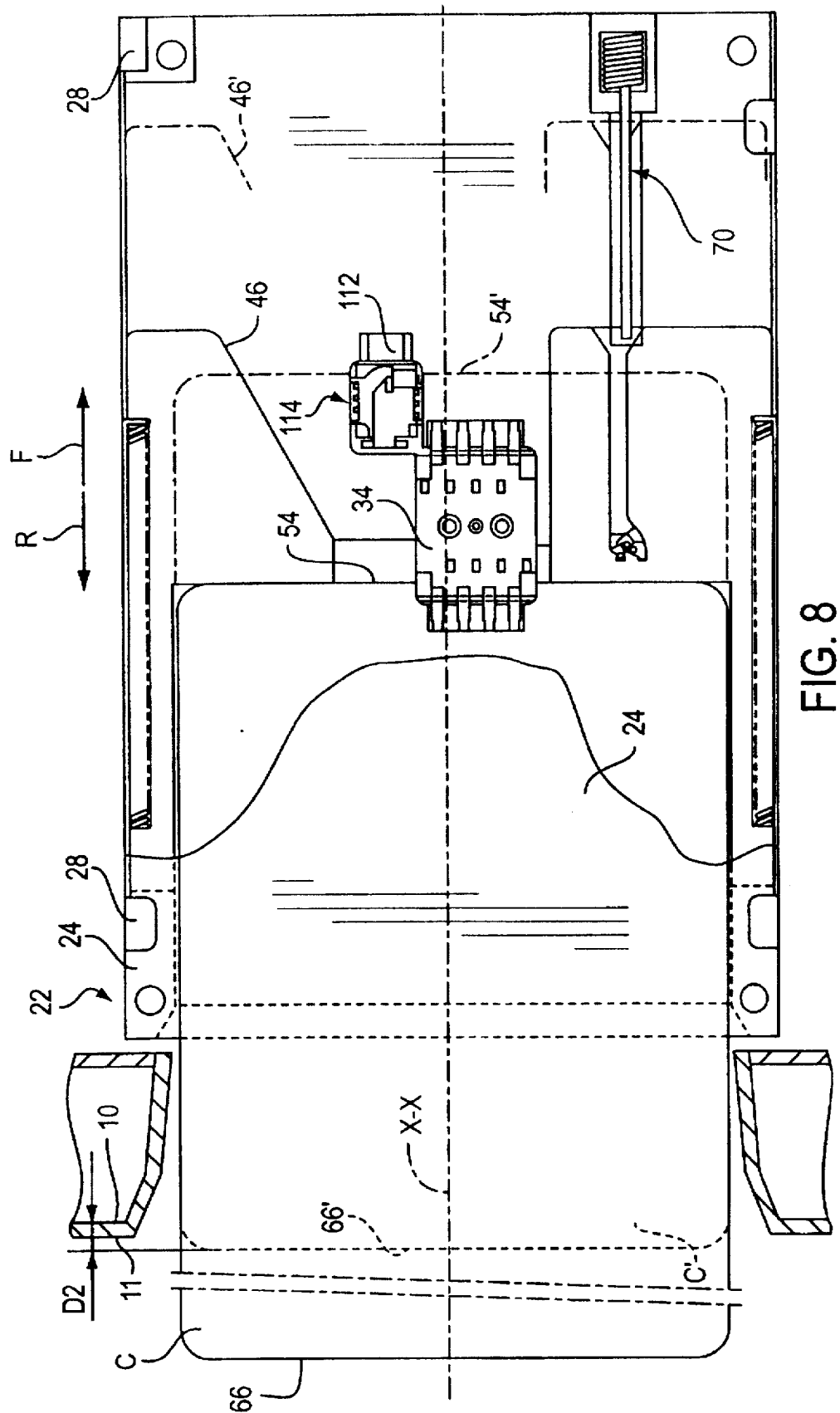
FIG. 8 is a view similar to that of FIG. 2, but showing a variant of the assembly.

In the initial, or partial insertion position shown in FIG. 2, the card C protrudes considerably from the rear of the case through a window 44, and rearward of the apparatus 10, by a distance D1 which is, for example, 23 mm for a card that has a total longitudinal (in directions 1) length such as 86 mm. When the card is installed to the initial insertion position shown in FIG. 2, further forward movement of the card is resisted by the springs 58 acting on the slide. Further forward movement of the card causes the slide and card to move further forward, to the fully inserted position shown in phantom lines in FIG. 8. In the fully inserted position, the card rear edge 66' projects only slightly rearwardly of the front face 11 of the apparatus such as a radio, with the projection distance D2 being perhaps 3 mm, so the slide has a travel distance of about 20 mm. When the slide is first pushed in, it is latched in the fully inserted position by the latching apparatus 70.

As shown in FIG. 6, the latching apparatus includes a hook 72 formed by a bent metal wire, with the main body 74 of the hook extending longitudinally. A rear free end 76 of the hook is bent 90° to extend down and engage an extension 78 of the slide 46. The slide has a longitudinal extension 78 with a groove 80 (FIG. 2) extending parallel to the insertion direction, which receives the free end of the hook. FIG. 6 shows that the forward end of the hook is received in a housing 84 lying in the upper plate 24 of the case 22, and which protrudes into the aperture 88 in the circuit board. The hook has a forward end 82 that is held in place while being pivotal about a vertical axis (with moderate friction), by a helical spring 87. The hook forward end lies in a passage formed in a stub that guides the spring. FIG. 7 shows different positions of the hook free end 76 as it moves laterally (L) within the rear end of groove 80 on the slide extension. At the end of a first forward thrust of the card and slide, the hook end 76 at P1, has moved along a groove section 94 and reached a position P2. The slide has over traveled by about 0.5 mm, and release of force on the card allow the latch free end to move from the position P2 to P3 (actually only the slide and its groove 80 move in longitudinal directions 1). The small amount S of over travel is less than the available length of the contact pads on the card. During a second forward thrust on the card, the hook free end moves against a groove end 110. Upon release of the card, the hook end moves along groove section 102.

In a card receiver assembly that applicant has designed for the card C of a length of 86 mm, for mounting on a circuit board 32 of a thickness of 1.5 mm (most common circuit boards are of the same or greater thickness, and almost all common circuit boards have a thickness of at least 1 mm). The bottom face of the lower plate 26 lay a distance of 4 mm below the bottom face of the circuit board. The upper surface 49 of the connector 34 projected above the upper face mount portion 39 of the upper plate (where the upper plate lay facewise against the circuit board lower face) by about 1.7 mm, so more than half the upward projection distance of the connector (above the plate face mount portion 39) lay within the aperture in the circuit board. The connector body 250 has a longitudinal length of 14 mm and lateral width of 11 mm, which are each less than half the longitudinal length of 98 mm of the case and receiver assembly and the lateral width of 64 mm of the case and assembly. The aperture 200 had a length of 15.5 mm and a width 12.5 mm. The other dimensions of the assembly are proportional to those cited above, as seen in FIGS. 1–2, 5–6 and 8.

Although terms such as "upper" and "lower" have been used to describe the apparatus as illustrated, it should be understood that the apparatus as described and claimed, can be used in any orientation with respect to Gravity; for example, the circuit board may actually lie below the case, or they may both extend in vertical planes.

Thus, the invention provides a card receiver assembly that can be constructed at moderate cost and shipped as a unit to a customer, who easily installs it on a circuit board, and with the addition of the receiver assembly adding little additional thickness to the electrical apparatus, such as a car radio. The apparatus includes a thin case and a separately constructed electrical connector with contacts that are preferably molded in place. The connector is mounted on a surface of the case, such as its top, and protrudes above the level of most of the case. The assembly is mounted on a circuit board which has an aperture cut therein into which the connector fits. As a result, additional height resulting from the assembly, is reduced by the thickness of the circuit board which receives the upwardly protruding connector. The connector has contacts with blades that engage card contact pads, and with contact tails that engage traces on the circuit board. The traces are preferably formed in the lower face of the board that faces the case, and the contact tails are preferably resiliently compressible in thickness, and compressed between the circuit board at its trace and the case of the assembly. It is also possible to use a circuit board aperture to receive a connector that is mounted on the circuit board instead of on the case, and that even may move in the aperture to engage card contact pads only when the card is fully inserted.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A card receiver assembly for mounting on a circuit board that has upper and lower faces and a plurality of contact traces on one of said faces, and for receiving a card that has a face with contact pads thereon, comprising:
   a case which has a front-to-rear length and a lateral width, said case having a card-receiving slot with an open card-receiving rear end, said case having an upper surface with surface mount portions lying in a plane to lie facewise against said lower face of said circuit board;
   an electrical connector which has an insulative connector body and a plurality of contacts, said connector body being mounted on said case, said contacts each having a blade extending into said card-receiving slot and having a contact tail constructed to engage one of said contact traces;
   said connector body having a longitudinal length and a lateral width that are respectively less than half the width and length of said case, and said connector body projects by at least one millimeter above said upper surface mount portion to fit into a hole in said circuit board.

2. The assembly described in claim 1 including said circuit board, wherein:
   said circuit board has a connector-receiving aperture;
   said case is attached to said circuit board with said upper surface mount portions lying facewise against said board lower face, and with said connector body lying in said connector-receiving hole of said circuit board.

3. The assembly described in claim 2 wherein:
   said connector-receiving aperture has an area that is less than twice the area occupied by said connector body, as seen in a plan view.

4. The assembly described in claim 1 wherein:
   said circuit board has a connector-receiving aperture;
   said case forms an upwardly protruding receptacle portion that fits closely in said circuit board aperture, with connector body lying closely in said receptacle portion.

5. The assembly described in claim 1 including said circuit board, and wherein:
   said upper plate has at least one recess lying adjacent to said aperture in said circuit board, said recess having a bottom wall that lies slightly below the level of said surface mount portions;
   said connector contacts have tails that are resiliently compressible in height, said tails each lying under said lower face of said circuit board and against one of said contact traces thereon, and being pressed upwardly and compressed in height by said bottom wall of said recess.

6. A combination of a circuit board with upper and lower faces, and a card receiver assembly for receiving an electronic card, with said receiver assembly mounted against said lower surface of said circuit board, wherein:
   said receiver assembly includes a case with a horizontal slot for receiving said card and an upper surface with a mount portion, and a connector that includes a connector body mounted on said case and projecting above said mount portion and a plurality of connector contacts;
   said circuit board having an aperture which can receive said connector body, and said receiver assembly is fixed to said circuit board, with said upper surface mount portion of said case lying facewise against said lower face of said circuit board and with said connector body projecting into said aperture.

7. The apparatus described in claim 6 wherein:
   said mount body projects a predetermined height above said board lower face, with more than half of said height lying in said aperture of said circuit board.

8. The combination described in claim 6 wherein:
   said circuit board has a plurality of contact traces lying on its lower face and adjacent to said aperture;
   said connector contacts each have blades for engaging said card when it lies in said slot, and have contact tails for engaging said contact traces on said circuit board;
   said tails each have tail ends that are resiliently compressible in height, said upper surface of said case has a recess with recess walls lying slightly lower than said mount portion and under said contact traces, and said tail ends lie in said recess and are compressed in height and press against said contact traces.

9. Apparatus for receiving an electronic card that has an upper card face with contact pads thereon, and for electronically communicating with said card through said contact pads, comprising:
   a circuit board with upper and lower board faces, and with an aperture therein, said circuit board having a plurality of traces lying adjacent to said aperture;

a case with a card-receiving slot that confines a card to movement along a card path to a full insertion position at which said contact pads lie at a predetermined contact location, said case having an upper surface with a mount portion that is mounted facewise against said circuit board lower face, with said predetermined contact location lying under said aperture and with said case upper wall having at least one case hole lying above said contact location;

a connector which includes a body and a plurality of contacts mounted on said body, said connector body lying in said circuit board aperture, with said contacts having blades positioned for extension through said case hole to directly engage one of said card contact pads.

10. A method for constructing an electronic apparatus that can receive and electronically communicated with an electronic card that has an upper face with contact pads thereon, comprising:

establishing a receiver assembly that has a case with upper and lower plate-like walls forming a card-receiving slot between them, with said upper wall having an upper surface mount portions lying in a common horizontal plane, and with said receiver assembly having a connector with a connector body lying on and projecting above said case upper wall and with a plurality of connector contacts that each has a contact blade for engaging one of said card contact pads;

forming a circuit board with upper and lower faces and with an aperture of a size to closely receive said connector body;

mounting said receiver assembly on said circuit board with said connector body projecting up into said aperture and with said upper surface mount portions lying facewise against said circuit board lower face.

11. The method described in claim 10 wherein:

said step of forming a circuit board includes forming a plurality of contact traces on said circuit board lower face beside said aperture;

said step of establishing a receiver assembly includes establishing said connector contacts with vertically compressible tails;

said step of mounting includes compressing said tails between said case upper wall and said contact traces on said circuit board lower face.

\* \* \* \* \*